US006907200B2

(12) United States Patent
Okuno

(10) Patent No.: US 6,907,200 B2
(45) Date of Patent: Jun. 14, 2005

(54) DISPERSION COMPENSATING MODULE, LINE SWITCHING APPARATUS AND OPTICAL COMMUNICATION SYSTEM

(75) Inventor: Toshiaki Okuno, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/788,434

(22) Filed: Mar. 1, 2004

(65) Prior Publication Data

US 2004/0165820 A1 Aug. 26, 2004

Related U.S. Application Data

(62) Division of application No. 09/726,601, filed on Dec. 1, 2000, now abandoned.

(30) Foreign Application Priority Data

Dec. 3, 1999 (JP) .................................... P1999-344754

(51) Int. Cl.⁷ ............................................ H04B 10/12
(52) U.S. Cl. ..................... 398/147; 398/148; 398/158; 398/79; 398/81; 398/82; 398/83; 398/45; 385/24; 385/27; 385/37
(58) Field of Search ................................ 398/147, 148, 398/158, 79, 81, 82, 83, 45; 385/24, 27, 37

(56) References Cited

U.S. PATENT DOCUMENTS

| 5,940,208 A | 8/1999 | Blaszyk et al. |
| 5,999,293 A | 12/1999 | Manning |
| 6,055,082 A | 4/2000 | Chikuma |
| 6,081,360 A | 6/2000 | Ishikawa et al. |
| 6,320,687 B1 | 11/2001 | Ishikawa |
| 6,351,323 B1 | 2/2002 | Onaka et al. |

FOREIGN PATENT DOCUMENTS

| EP | 0 812 075 A2 | 12/1997 |
| EP | 0 902 558 A2 | 3/1999 |
| JP | 8-274713 | 10/1996 |
| JP | 10-41891 | 2/1998 |
| JP | 10-84317 | 3/1998 |
| JP | 11-68657 | 3/1999 |
| JP | 11-88260 | 3/1999 |
| JP | 11-88261 | 3/1999 |
| JP | 11-251973 | 9/1999 |

*Primary Examiner*—Hanh Phan
(74) *Attorney, Agent, or Firm*—McDermott Will & Emery LLP

(57) ABSTRACT

The present invention relates to a dispersion compensating module or the like having a simple and compact structure. The dispersion compensating module comprises a plurality of dispersion compensators between its input and output ends and at least one or more optical switches disposed between these dispersion compensators. Each of the optical switches acquires signals reached from its first port and is switching-controlled so that the signals are outputted from one of its second and third ports. The dispersion compensating module controls the port switching operation of at least one of the optical switches, thereby adjusting the propagation line of the signals, i.e., the dispersion compensation amount. In this manner, the dispersion of the signals which reached the input end of the dispersion compensating module is compensated for by an amount determined in accordance with the installation position of the optical switch in which port switching is to be performed, and the dispersion-compensated signals are outputted from the output end of the dispersion compensating module.

10 Claims, 9 Drawing Sheets

DISPERSION COMPENSATING MODULE, LINE SWITCHING APPARATUS AND OPTICAL COMMUNICATION SYSTEM

This application is a divisional of application Ser. No. 09/726,601 filed Dec. 1, 2000, now abandoned.

BACKGROUND OF THE INVENTION

1. Field of the Invention

The present invention relates to a dispersion compensating module which compensates for a dispersion of an optical transmission line in a signal wavelength band, and a line switching device including the dispersion compensating module and having a structure for performing line switching so that part of signals which propagate in an optical transmission line constituting part of an optical communication network in another optical transmission line, as well as an optical communication system which includes the dispersion compensating module.

2. Related Background Art

In an optical communication system, a single mode optical fiber is generally applied to an optical transmission line through which signals on a plurality of channnels propagate. This single mode optical fiber has a chromatic dispersion (hereinafter referred to simply as "dispersion") of approximately zero near a 1.33 µm wavelength and a positive dispersion in a wavelength band of 1.3 µm, and a single mode is ensured in both the 1.3 µm wavelength band and 1.55 µm wavelength band. The single mode optical fiber is a silica-based optical fiber which includes a core which is doped with $GeO_2$ or is made of pure silica, and a cladding doped with the F element. It is known that a transmission loss of this single mode optical fiber becomes the smallest in a 1.55 µm wavelength band.

In an optical communication system in which the single mode optical fiber is applied as an optical transmission line, a signal wavelength band makes use of a 1.3 µm wavelength band in which the dispersion of the single mode optical fiber can be reduced, or a 1.55 µm wavelength band in which the transmission loss of the single mode optical fiber is the smallest. Incidentally, since a fiber optic amplifier capable of amplifying signals of wavelength band 1.55 µm has been developed, the 1.55 µm wavelength band is often used as the signal wavelength band.

If the optical transmission line has a dispersion in the signal wavelength band, the waveform of each signal becomes degraded in accordance with to the propagation distance of the signals, and when the waveform degradation becomes large to some extent, there is a possibility that reception error occurs. To cope with this problem, a dispersion compensating module compensating for the dispersion is provided on the optical transmission line. The dispersion compensating module has a dispersion of sign different from that of the dispersion of the optical transmission line, and the dispersion of the optical transmission line is cancelled by the dispersion of this dispersion compensating modules whereby the degraded signal waveform is restored.

In the dispersion compensating module, if the dispersion compensation amount can be set on the basis of the degree of waveform degradation of each signal which propagates through the optical transmission line, the degraded signal waveform can be restored irrespective of the degree of degradation of the signal waveform. For example, when signals suffer a large waveform degradation while the signals propagate through a long-haul optical transmission line, the dispersion compensating module reforms the greatly degraded signal waveforms by setting the dispersion compensation amount to an increased amount. On the other hand, when signals suffer a small waveform degradation while the signals propagate through a short-haul optical transmission line, the dispersion compensating module restores the slightly degraded signal waveforms by setting the dispersion compensation amount to a decreased amount. Several kinds of dispersion compensating modules each of which is variable in its dispersion compensation amount have been proposed.

For example, Japanese Patent Laid-Open No. 251973/1999 proposes a dispersion compensating module which compensates for the dispersion of test light outputted separately from signals transmitted from a transmitting section by means of a variable dispersion compensator, detects the degree of waveform distortion of the dispersion-compensated test light, and provides feedback control over the dispersion compensation amount of the variable dispersion compensator on the basis of the detected degree of waveform degradation. Owing to this construction, the dispersion compensating module can restore the degraded signal waveform irrespective of the degree of waveform degradation of each signal outputted from the transmitting section.

Japanese Patent Laid-Open Nos. 88261/1999 and 68657/1999 propose a dispersion compensating module which detects the strength of dispersion-compensated signals of a specific wavelength which exists in a signal wavelength band, and provides feedback control over the dispersion compensation amount of a variable dispersion compensator to maximize or minimize the detected signal intensity of the specific wavelength.

Japanese Patent Laid-Open No. 41891/1998 proposes a dispersion compensating module which has a structure in which an annular optical fiber is optically coupled via an optical switch to an optical fiber connected to an optical transmission line, and which adjusts the dispersion compensation amount by the on-off switching of the optical switch.

In addition, Japanese Patent Laid-Open No. 88260/1999 proposes a dispersion compensating module which includes a fixed dispersion compensating section having a fixed dispersion compensation amount and a variable dispersion compensating section having a variable dispersion compensation amount so that the dispersion of an optical transmission line is roughly compensated for by the fixed dispersion compensating section and is precisely compensated for by the variable dispersion compensating section.

SUMMARY OF THE INVENTION

The present inventors have investigated the above-described prior arts and discovered the following problems. Specifically, the dispersion compensating module described in Japanese Patent Laid-Open No. 251973/1999 not only needs to transmit test light of a special waveform separately from the signals transmitted from the transmitting section, but also has a dedicated structure for controlling the dispersion compensation amount of the variable dispersion compensator, so that the structure of the entire system becomes complicated and large-sized and the manufacturing cost of the dispersion compensating module becomes high.

The dispersion compensating module described in Japanese Patent Laid-Open No. 41891/1998 can only select one of a dispersion compensation enabled state and a dispersion compensation disable state by controlling the connection and non-connection to the annular optical fiber by the on-off switching of the optical switch, and needs annular optical fibers prepared for individual signals. This leads to a large-sized system having high manufacturing cost.

The dispersion compensating module described in Japanese Patent Laid-Open No. 88260/1999 is constituted so that the dispersion of an optical transmission line is roughly compensated for by the fixed dispersion compensating section and is precisely compensated for by the variable dispersion compensating section. For this reason, the width of variation of the dispersion compensation amount is small.

Moreover, none of Japanese Patent Laid-Open Nos. 251973/1999, 88261/1999 and 68657/1999 and 88260/1999 has any disclosure or a satisfactory disclosure as to a specific construction of the variable dispersion compensator.

The present invention has been made to solve the above-described problems, and provides a dispersion compensating module having a simple and compact construction as well as a line switching device and an optical communication system each including the dispersion compensating module.

A dispersion compensating module according to the present invention is disposed on an optical transmission line through which signals in a plurality of channels in a signal wavelength band propagate, and compensates for the dispersion of the optical transmission line in the signal wavelength band. The dispersion compensating module includes an input end for introducing signals which propagate through the optical transmission line and an output end for outputting the signals inputted from the input end to the optical transmission line. A plurality of dispersion compensators which constitute a line connecting the input end and the output end are disposed between the input end and the output end, and branching optical switchs are disposed between the plurality of dispersion compensators.

Each of the dispersion compensators has a dispersion of sign opposite to that of the dispersion of the optical transmission line in the signal wavelength band. Each of the branching optical switches has a first port for inputting the signals from an adjacent dispersion compensator positioned upstream as viewed from a traveling direction of the signals, a second port for outputting the signals from the first port to an adjacent dispersion compensator positioned downstream, and a third port for conducting the signals from the first port to a branch line different from an optical path constituted by the plurality of dispersion compensators. The dispersion compensating module further includes an optical output section for conducting to the output end at least one of a group of the signals which reachs from the most downstream dispersion compensator positioned most downstream among the plurality of dispersion compensators as viewed in the traveling direction of the signals and a group of the signals which reach from the branch line connected to the third port of each of the branching optical switches. Incidentally, the dispersion compensating module may further include a control section for controlling port switching in at least one of the input optical switch and the branching optical switches so that the signals inputted from the first port are outputted from one of the second and third ports.

The dispersion compensation amount of this dispersion compensating module is determined on the basis of the number of dispersion compensator, through which the signals pass, from the dispersion compensators, based on the state of port switching in each of the branch optical switches. Accordingly, in the dispersion compensating module, the dispersion compensation amount is variable. The dispersion of the signals propagating through the optical transmission line and reaching the input end of the dispersion compensating module are compensated for by the dispersion compensation amount set in the above-described manner, and the signals are outputted to the optical transmission line from the output end of the dispersion compensating module. In addition, all signals introduced from the input end of the dispersion compensating module are conducted to the output end of the dispersion compensating module by the optical output section.

The dispersion compensating module according to the present invention further includes an input optical switch disposed between the input end and the most upstream dispersion compensator positioned most upstream among the plurality of dispersion compensators as viewed from the traveling direction of the signals. The input optical switch includes a first port for inputting the signals from the input end, a second port for outputting the signals from the first port to the most upstream dispersion compensator, and a third port for conducing the signals from the first port to a branch line different from the optical path constituted by the plurality of dispersion compensators. When no dispersion compensation is needed, the optical path from the first port to the third port is controlled to be placed in a propagation enabled state, whereby the signals are conducted to the output end of the dispersion compensating module without passing through any of the dispersion compensators.

Incidentally, in the case where the dispersion compensating module has the above-described structure provided with the input optical switch, the optical output section conducts to the output end of the dispersion compensating module at least one of a group of the signals which reach from the most downstream dispersion compensator positioned most downstream among the plurality of dispersion compensators as viewed in the traveling direction of the signals, a group of the signals which reach from the branch line connected to the third port of each of the branching optical switches, and a group of the signals from the branching line connected to the third port of the input optical switch. The control section controls port switching in at least one of the input optical switch and the branching optical switches so that the signals inputted from the first port are outputted from one of the second and third ports.

In the dispersion compensating module according to the present invention, each of dispersion compensators includes a dispersion compensation optical fiber having a negative dispersion in the signal wavelength band. In this case, each of the dispersion compensators has a small insertion loss, and the dispersion compensation amount of each of the dispersion compensators can easily be set by individually adjusting the length thereof, whereby it is possible to cope with dispersion compensation over a far wider wavelength band.

In the dispersion compensating module according to the present invention, each of the input optical switch and the branching optical switches preferably includes a planar optical waveguide with one of a thermooptic element, an acousticoptic element, and a semiconductor amplifier. Such an optical switch is capable of performing high-speed port switching, and is superior in terms of an improvement in connectivity to a dispersion compensating optical fiber which serves as a dispersion compensator and a reduction in crosstalk. In particular, in the case where each of the optical switches is a switch using an acousticoptic element or a semiconductor amplifier, far higher-speed port switching is possible.

A line switching device according to the present invention comprises a dispersion compensating module having the above-described structure. In particular, the line switching device includes a branching section branching signals of a predetermined wavelength band (contained in the signal wavelength band) from signals propagating through the optical transmission line in the optical communication network constituted by one or more optical transmission lines. Incidentally, in this case, the output port of the branching section corresponds to the input end of the dispersion compensating module, and the signals branched by the branching section are dispersion-compensated by the dispersion compensating module according to the present invention. In accordance with the line switching device, not only is it possible to realize line switching between the optical transmission lines which constitute the optical communication network, but also selective dispersion compensation for signals becomes possible.

In the line switching device according to the present invention, the branching section includes an add drop multiplexer (ADM). Since the wavelength band of branched signals is generally fixed and hence a wavelength band over which to ensure the operation of the line switching device is fixed, the line switching device becomes easy to design.

The branching section may also be an optical cross connect instead of the ADM, because the degree of freedom of selection among signal waveforms can be increased. In addition, the stability of the system can easily be ensured by designing the amount of variation in dispersion compensation together with the optical cross connect.

Incidentally, the line switching device according to the present invention further includes a control section for controlling a branching function of the branching section and a port switching operation of each of the optical switches in the dispersion compensating module in a mutually interlocked relation. In this case, the reliability of the entire optical communication network increases.

In the line switching device according to the present invention, the signals branched by the branching section contains a pilot signal indicative of a signal source which has transmitted the signals. In this case, the line switching device further includes a receiving section which receives the pilot signal contained in the branched signals and a control section which controls the operation of each of the optical switches in the dispersion compensating module on the basis of the pilot signal received by the receiving section. In this manner, the setting of each of the optical switches, i.e., the setting of the dispersion compensation amount, can be easily and reliably effected.

Moreover, the optical communication system according to the present invention includes a dispersion compensating module having the above-described structure capable of adjusting the dispersion compensation amount by means of port switching in an optical switch. In accordance with the optical communication system, the dispersion of an optical transmission line is compensated for by the dispersion compensating module. Even if the amount of dispersion of the optical transmission line varies due to any cause such as switching between lines or a change in line length, the dispersion compensating module can appropriately set the dispersion compensation amount by the port switching of the optical switch, whereby optimum compensation for dispersion occurring in the optical transmission line is enabled. Accordingly, the optical communication system can effectively restrain degradation of signal waveforms, thereby realizing good optical transmission characteristics. In addition, since the dispersion of the optical transmission line is dynamically compensated for by the port switching of the optical switch in the dispersion compensating module, the time required to set the dispersion compensation amount is short and high reliability can be obtained in the entire optical communication system.

In addition, the optical transmission line in the optical communication system according to the present invention may have a plurality of lines between a first station and a second station. In this case, the optical communication system preferably further includes a control section which selects one line from the plurality of lines and also sets the dispersion compensation amount by the port switch of the optical switch of the dispersion compensating module. For example, a main transmission line (to be used under normal conditions) and an alternative transmission line (to be used under abnormal conditions or during malfunction) are prepared as the optical transmission lines between the first station and the second station, and even if the main transmission line and the alternative transmission line differ in accumulated dispersion, one of the main transmission line and the alternative transmission line is selected by the control section, and the dispersion compensation amount is appropriately set by the port switching of the optical switch in the dispersion compensating module. Accordingly, whichever line may be selected, the degradation of signal waveforms can be effectively restrained and good transmission quality can be maintained in the entire optical communication system.

Incidentally, in the optical communication system, it is preferable that the control section approximately simultaneously (in parallel) carry out line selection from the optical transmission lines and the setting of the dispersion compensation amount of the dispersion compensating module. Since the line selection and the setting of the dispersion compensation amount are approximately simultaneously carried out in this manner, the time required to set the dispersion compensation amount is shorted to a further extent and far higher reliability can be obtained in the entire optical communication system. In addition, in the optical communication system, the dispersion compensating module is preferably incorporated in the first station, the second station or a transit station disposed between the first station and the second station. In any construction, the dispersion compensation amount of the dispersion compensating module is set according to the accumulated dispersion of a line from a transmitter incorporated in the first station to a receiver incorporated in the second station.

In the optical communication system according to the present invention, the optical transmission line preferably includes a ring-type network. In the ring-type network, one line (alternative transmission line) among plurality of lines is constructed to have a turn, and its accumulated dispersion varies to a great extent by changing the turn. In general, a position which can become the turn is known, i.e., a value which can be taken as the accumulated dispersion is known, and even if the position of the turn is changed, an appropriate dispersion compensation amount is set for the dispersion compensating module and degradation of signal waveforms is effectively restrained and high transmission quality is maintained.

Incidentally, in the optical communication system according to the present invention, at least one of the signal channels is a signal channel having the range of wavelengths 1,530 nm to 1,565 nm. In general, a silica-base single mode optical fiber whose dispersion is zero near a 1.3 $\mu$m wavelength and whose transmission loss is the smallest near a 1.55 $\mu$m wavelength is applied to the optical transmission line of the optical communication system. At this time, if its signal channels have a 1.55 $\mu$m wavelength band (1,530 nm to 1,565 nm), the signals of the respective channels can propagate through the optical transmission line with the smallest transmission loss and can reduce accumulated losses after having passed through the dispersion compensating module. Moreover, at least one of the signal channels preferably has a bit rate of 10 Gb/s or more. In this case, the degradation of signal waveforms due to accumulated dispersion may be remarkable, but in this optical communication system, since the dispersion compensating module which can be adjusted in the dispersion compensation amount is applied, such waveform degradation is not at all remarkable, whereby good transmission quality can be maintained.

DESCRIPTION OF THE PREFERRED EMBODIMENTS

Figure 1:
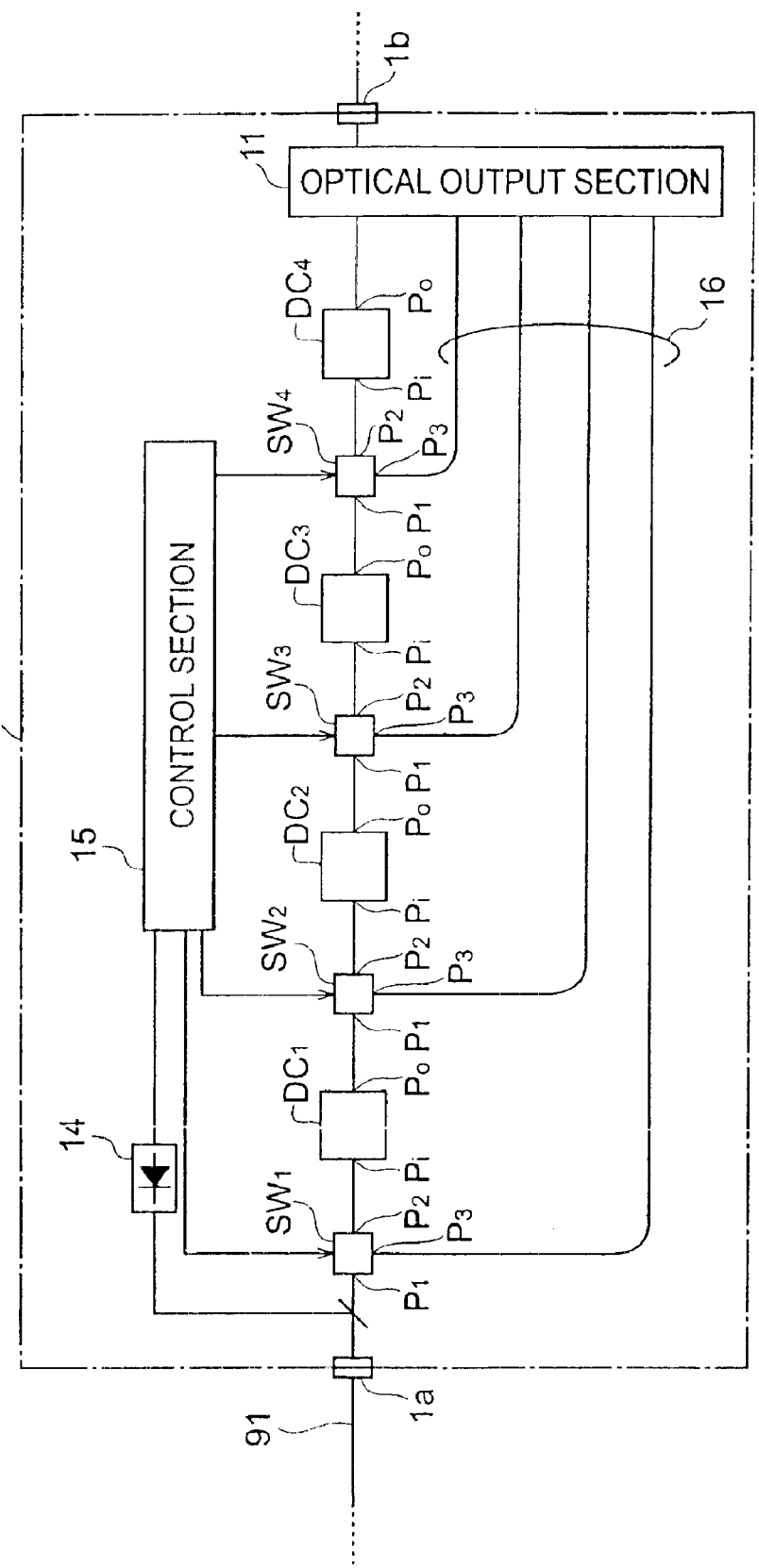
FIG. 1 is a view showing the structure of a first embodiment of a dispersion compensating module according to the present invention.

Preferred embodiments of each of a dispersion compensating module, a line switching device and an optical communication system according to the present invention will be described below in detail with reference to FIGS. 1 to 11. In the description of the drawings, identical elements are denoted by identical reference numerals, and the repetition of the same description is omitted.

(First Embodiment of Dispersion Compensating Module)

FIG. 1 is a view showing the structure of a first embodiment of a dispersion compensating module according to the present invention. As shown in FIG. 1, a dispersion compensating module 1 according to the first embodiment is provided with four optical switches $SW_1$ to $SW_4$, four dispersion compensators $DC_1$ to $DC_4$, and an optical output section 11. Each optical switch $SW_n$ ($1 \leq n \leq 4$) and each dispersion compensator $DC_n$ ($1 \leq n \leq 4$) are alternately disposed between an input end $1a$ and an output end $1b$ of the dispersion compensating module 1. In addition, the dispersion compensating module 1 shown in FIG. 1 is provided with a receiver 14 for monitoring the signals introduced through the input end $1a$ and a control section 15 which individually controls the port switching of each of the optical switches $SW_1$ to $SW_4$ on the basis of the electrical signals transmitted from the receiver 14.

Each of the dispersion compensators $DC_n$ ($1 \leq n \leq 4$) has an input port $P_i$ and an output port $P_o$. In a particular signal wavelength band, for example a 1.55 $\mu$m wavelength band, the sign of dispersion from the input port $P_i$ to the output port Po of each of the dispersion compensators $DC_n$ is the inverse of the sign of dispersion in an optical transmission line 91 for which is to be compensated by the dispersion compensating module 1. For example, if the optical transmission line 91 is a single mode optical fiber having a positive diffusion at wavelength 1.55 $\mu$m, each of the dispersion compensators $DC_n$ has a negative diffusion at wavelength 1.55 $\mu$m.

Each of the optical switches $SW_n$ ($1 \leq n \leq 4$) has a first port $P_1$, a second port $P_2$ and a third port $P_3$. The control section 15 exerts port-switching control so that any of the optical switches $SW_n$ selects either of the second port $P_2$ and the third port $P_3$ as an output port for outputting the signals introduced through the first port $P_1$. The switching of signal outputs to one of the second port $P_2$ and the third port $P_3$ in each of the optical switches $SW_n$ ($1 \leq n \leq 4$) is controlled according to the degree of waveform degradation of each signal introduced into the dispersion compensating module 1 through the input end $1a$, or according to the distance of the optical transmission line 91 through which the introduced signals have propagated, i.e., accumulated dispersion.

The first port $P_1$ of the first optical switch $SW_1$ (or input optical switch) is connected to the input end $1a$ of the dispersion compensating module 1. The first port $P_1$ of each of the second and following optical switches $SW_n$ ($2 \leq n \leq 4$) (branch optical switches) is connected to the output port Po of the dispersion compensator $DC_{n-1}$. The second port $P_2$ of each of the optical switches $SW_n$ ($1 \leq n \leq 4$) is connected to the input port $P_i$ of the dispersion compensator $DC_n$. The third port $P_3$ of each of the optical switches $SW_n$ ($1 \leq n \leq 4$) is connected to a branch line 16, which is connected to the optical output section 11.

The optical output section 11 conducts signals which are outputted from the output port Po of the final dispersion compensator $DC_4$ and from the third port $P_3$ of each of optical switches $SW_n$ ($1 \leq n \leq 4$), to the output end $1b$ of the dispersion compensating module 1. Incidentally, it is preferable that the optical output section 11 be a light wave combiner or an optical path switch.

Figure 2:
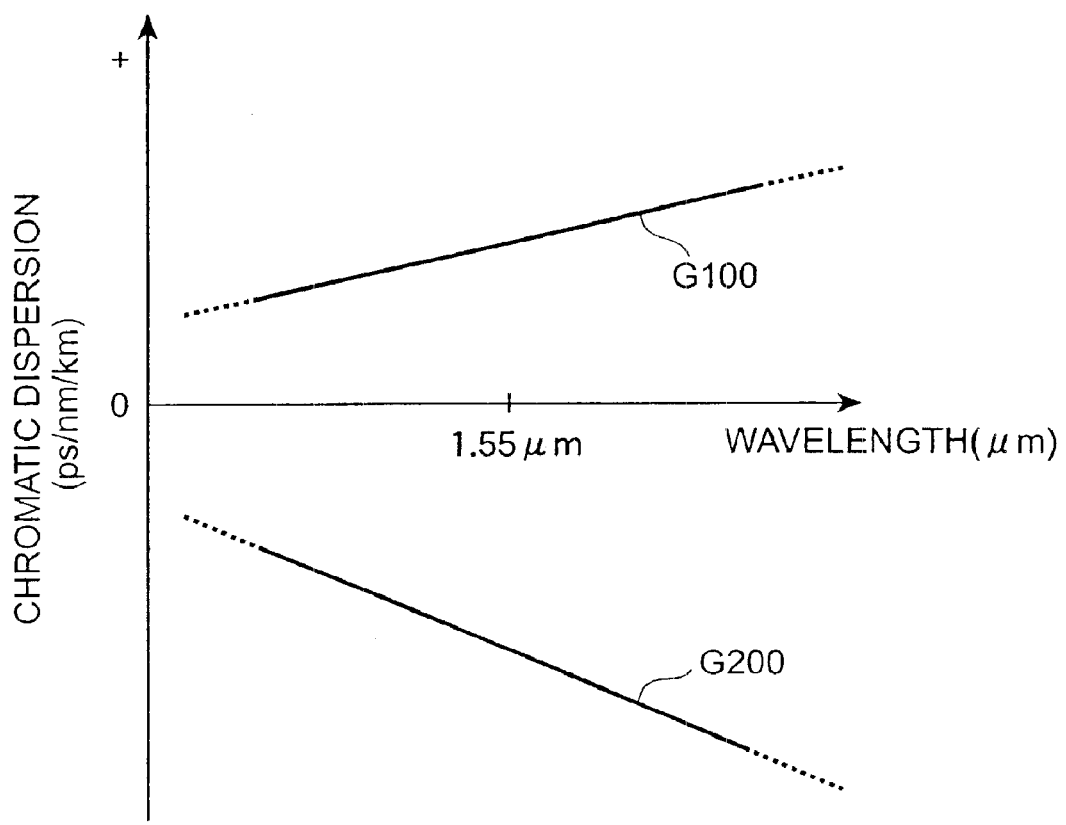
FIG. 2 is a graph aiding in describing the dispersion characteristic of a dispersion compensation optical fiber serving as a dispersion compensator.

FIG. 2 is a graph aiding in describing the dispersion characteristic of a dispersion compensation optical fiber which serves as the dispersion compensator $DC_n$. In FIG. 2, a line G100 shows the chromatic dispersion of a single mode optical fiber which serves as the optical transmission line 91, and a line G200 shows the chromatic dispersion of the dispersion compensating optical fiber.

Each of the dispersion compensators $DC_n$ is preferably a dispersion compensation optical fiber. In other words, in the case where a dispersion compensation optical fiber is applied to each of the dispersion compensators $DC_n$, insertion loss can be made small and the setting of the dispersion compensation amount is facilitated by adjustment of the length of each of the dispersion compensation optical fibers.

Accordingly, dispersion compensation becomes possible over a far wider wavelength band. In addition, a dispersion compensation optical fiber having a negative diffusion at wavelength 1.55 μm is suited to dispersion compensation for a single mode optical fiber (the optical transmission line 91) having a positive diffusion at wavelength 1.55 μm. Moreover, since the single mode optical fiber has a positive dispersion slope at wavelength 1.55 μm, if a dispersion compensation optical fiber having a negative dispersion slope at wavelength 1.55 μm is applied to the single mode optical fiber, a wavelength band over which dispersion compensation is possible can be widened to a further extent.

Figure 3:
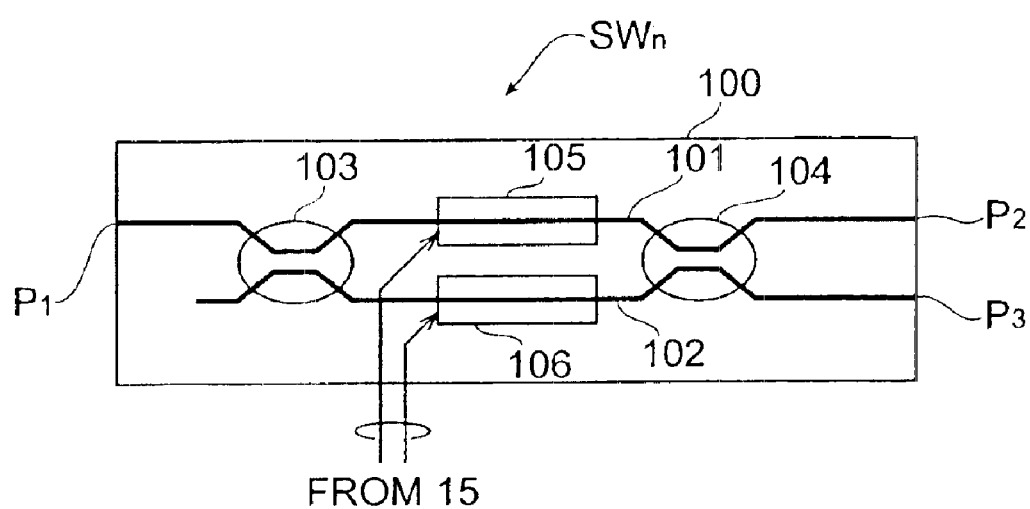
FIG. 3 is a view showing the construction of an optical switch.

FIG. 3 is a view showing one example of the construction of the optical switch $SW_n$. As shown in FIG. 3, each of the optical switches $SW_n$ is formed on a planar optical waveguide, and is preferably a switch which uses a thermooptic element, an acousticoptic element or a semiconductor amplifier. Specifically, the optical switch $SW_n$ includes a substrate 100, and an optical waveguide 101 is formed between the first port $P_1$ and the second port $P_2$ on the substrate 100 and an optical waveguide 102 is formed in such a manner as to lead to the third port $P_3$ at one end. The optical waveguide 101 and the optical waveguide 102 are optically coupled to each other by a coupler 103 and a coupler 104. A temperature adjustment element 105 is disposed on the portion of the optical waveguide 101 located between the coupler 103 and the coupler 104, while a temperature adjustment element 106 is disposed on the portion of the optical waveguide 102 located between the coupler 103 and the coupler 104. Each of the temperature adjustment elements 105 and 106 is, for example, a heater or a Peltier element.

The optical switch $SW_n$ which constitutes a Mach-Zehnder interferometer in this manner adjust the respective temperatures of the optical waveguides 101 and 102 by means of the temperature adjustment elements 105 and 106, and switches the signals inputted through the first port $P_1$ to one of the second port $P_2$ and the third port $P_3$ and outputs the signals from the selected port. This optical switch $SW_n$ is capable of effecting high-speed port switching, and is superior in terms of an improvement in connectivity to the dispersion compensation optical fiber which serves as the dispersion compensator $DC_n$, and a reduction in crosstalk. In addition, this optical switch $SW_n$ allows the time required for port switching to be reduced to one second or less and therefore has no great influence on information transmission in an optical communication system. Moreover, the application of an optical switch based on a semiconductor amplifier or an acousticoptic element realizes far higher-speed port switching and improves the reliability of the optical communication system.

The operation of the dispersion compensating module 1 according to the first embodiment will be described below. For example; in the first optical switch $SW_1$, if the optical path from the first port $P_1$ to the third port $P_3$ is in a signal passage enabled state, the signals, which reach the input end 1a of the dispersion compensating module 1, pass through the branch line 16 and the optical output section 11 in sequence without being dispersion-compensated by any of the dispersion compensators $DC_n$ and are outputted to the optical transmission line from the output end 1b of the dispersion compensating module 1.

If in the first optical switch $SW_1$ the optical path from the first port $P_1$ to the second port $P_2$ is in a signal passage enabled state and if, in the second optical switch $SW_2$, the optical path from the first port $P_1$ to the third port $P_3$ is in a signal passage enabled state, the signals, which reach the input end 1a of the dispersion compensating module 1, are dispersion-compensated by the first dispersion compensator $DC_1$ and then pass through the branch line 16 and the optical output section 11 in sequence, and are outputted from the output end 1b of the dispersion compensating module 1 to the outside of the dispersion compensating module 1 (the optical transmission line).

If, in each of the first and second optical switches $SW_1$ and $SW_2$, the optical path from the first port $P_1$ to the second port $P_2$ is in a signal passage enabled state and if, in the third optical switch $SW_3$, the optical path from the first port $P_1$ to the third port $P_3$ is in a signal passage enabled state, the signals, which reach the input end 1a of the dispersion compensating module 1, are dispersion-compensated by the two dispersion compensators $DC_1$ and $DC_2$ and then pass through the branch line 16 and the optical output section 11 in sequence, and are outputted from the output end 1b of the dispersion compensating module 1 to the outside of the dispersion compensating module 1.

If, in each of the first to third optical switches $SW_1$ to $SW_3$, the optical path from the first port $P_1$ to the second port $P_2$ is in a signal passage enabled state and if, in the fourth optical switch $SW_4$, the optical path from the first port $P_1$ to the third port $P_3$ is in a signal passage enabled state, the signals, which reach the input end 1a of the dispersion compensating module 1, are dispersion-compensated by the three dispersion compensators $DC_1$ to $DC_3$ and then pass through the branch line 16 and the optical output section 11 in sequence, and are outputted from the output end 1b of the dispersion compensating module 1 to the outside of the dispersion compensating module 1.

If, in each of the first to fourth optical switches $SW_1$ to $SW_4$, the optical path from the first port $P_1$ to the second port $P_2$ is in a signal passage enabled state, the signals, which reach the input end 1a of the dispersion compensating module 1, are dispersion-compensated by all of the dispersion compensators $DC_1$ to $DC_4$ and then pass through the optical output section 11, and are outputted from the output end 1b of the dispersion compensating module 1 to the outside of the dispersion compensating module 1.

As described above, the dispersion compensating module 1 according to the first embodiment is variable in its dispersion compensation amount which includes different amounts of dispersion compensation which are set according to the states of port switching in the respective optical switches $SW_n$ ($1 \leq n \leq 4$). The dispersion of the signals propagating through the optical transmission line 91 and reaching the input end 1a of the dispersion compensating module 1 is compensated for by the dispersion compensation amount which is set in the above-described manner, and the dispersion-compensated signals are outputted to the optical transmission line from the output end 1b of the dispersion compensating module 1. Accordingly, the dispersion compensating module 1 according to the first embodiment is simple and compact in construction.

The setting of the dispersion compensation amount of the dispersion compensating module 1, i.e., the setting of the port switching in each of the optical switches $SW_n$ ($1 \leq n \leq 4$), may also be carried out in such a way that the control section 15 detects, through the receiver 14, the extent of waveform degradation of the signals which reach the input end 1a of the dispersion compensating module 1, and performs the setting of the port switching on the basis of the detected result. Otherwise, the signals propagating through the optical transmission line 91 may also contain a pilot signal indicative of a signal source which has outputted the signals. On the basis of the pilot signal, the control section 15 obtains the distance (or accumulated dispersion) of the optical transmission line 91 to the signal source which has outputted the signals, and controls the operation of each of the optical switches $SW_n$ ($1 \leq n \leq 4$). In addition, the control section 15 may obtain information indicative of the distance (or accumulated dispersion) of the optical transmission line 91 to the signal source by any means other than the use of the pilot signal, and may control the operation of each of the optical switches $SW_n$ ($1 \leq n \leq 4$) on the basis of that information. In the case where individual transmitting sections have different signal wavelengths, the control section 15 may also control the operation of each of the optical switches $SW_n$ ($1 \leq n \leq 4$) on the basis of the wavelength of each signal.

Incidentally, in the first embodiment, the first optical switch $SW_1$ is disposed immediately after the input end 1a of the dispersion compensating module 1, and in the case where there is no need for dispersion compensation, the dispersion compensating module 1 can be set so that no signal passes through any of the dispersion compensators $DC_1$ to $DC_4$. However, in the case where the distance by which the signals propagate through the optical transmission line 91 until the signals reach the input end 1a is consistently greater than or equal to a constant distance and dispersion compensation is consistently needed, it is not necessary to incorporate the optical switch $SW_1$, and the dispersion compensating module 1 may be constructed so that the signals can pass through at least the first dispersion compensator $DC_1$.

In the first embodiment, since the dispersion compensating module 1 is provided with the optical output section 11, the dispersion compensating module 1 is constructed so that all signals introduced from the input end 1a of the dispersion compensating module 1 are conducted to the output end 1b. However, the dispersion compensating module 1 may not be provided with the optical output section 11, and may be constructed so that the signals outputted from the third port $P_3$ of each of the optical switches $SW_n$ pass through the corresponding one of the branch lines 16 and are outputted to the corresponding one of different output ends.

In addition, a light amplifier may be incorporated as required. The insertion position of the light amplifier is arbitrary. For example, if the light amplifier is inserted between each of the optical switches SWn and the optical output section 11, the dispersion compensating module 1 is able to perform signal amplification under constant gain control with a gain which is set according to the distance of the optical transmission line 91 to a signal source which has outputted signals, i.e., signal power.

(Second Embodiment of Dispersion Compensating Module)

Figure 4:
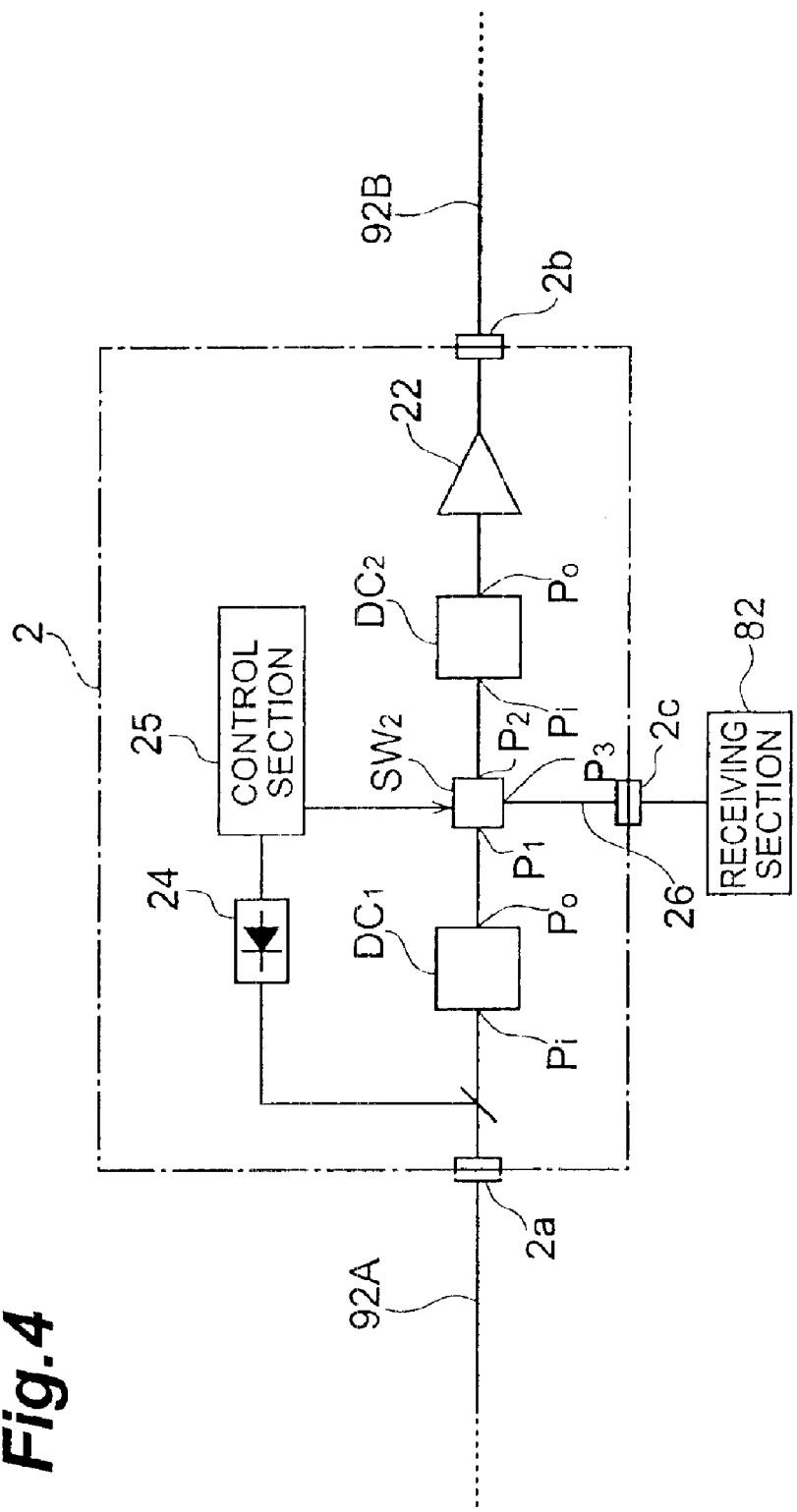
FIG. 4 is a view showing the structure of a second embodiment of the dispersion compensating module according to the present invention.

A dispersion compensating module according to a second embodiment will be described below. FIG. 4 is a view showing the construction of the second embodiment of a dispersion compensating module 2 according to the present invention. In FIG. 4, there is also shown a receiving section 82. The dispersion compensating module 2 according to the second embodiment is provided with one optical switch $SW_2$, two dispersion compensators $DC_1$ and $DC_2$, a light amplifier 22, a receiver 24 and a control section 25. The dispersion compensator $DC_1$, the optical switch $SW_2$, the dispersion compensator $DC_2$ and the light amplifier 22 are disposed in that order between an input end 2a and an output terminal 2b of the dispersion compensating module 2. The optical switch $SW_2$ has the structure shown in FIG. 3. Each of the dispersion compensators $DC_1$ and $DC_2$ has a structure similar to that of the corresponding dispersion compensator of the first embodiment.

An input port $P_i$ of the first optical switch $SW_1$ is connected to the input end 2a of the dispersion compensating module 2 and is further connected to an optical transmission line 92A. The first port $P_i$ of the optical switch $SW_2$ is connected to the output port Po of the preceding dispersion compensator $DC_1$. The second port $P_2$ of the optical switch $SW_2$ is connected to the input port $P_i$ of the succeeding dispersion compensator $DC_2$. The third port $P_3$ of the optical switch $SW_2$ is connected to an output end 2c of the dispersion compensating module 2 via a branch line 26, and is further connected to the receiving section 82. The output port Po of the succeeding dispersion compensator $DC_2$ is connected to the output end 2b of the dispersion compensating module 2, and is further connected to an optical transmission line 92B.

The operation of the dispersion compensating module 2 according to the second embodiment will be described below.

In the optical switch $SW_2$, if the optical path from the first port $P_1$ to the third port $P_3$ is in a signal passage enabled state, the signals, which reach the input end 2a of the dispersion compensating module 2 are dispersion-compensated by only the preceding dispersion compensator $DC_1$ and then reach the receiving section 82 via the branch line 26 and the output end 2c of the dispersion compensating module 2. On the other hand, in the optical switch $SW_2$, if the optical path from the first port $P_1$ to the second port $P_2$ is in a signal passage enabled state, the signals, which reach the input end 2a of the dispersion compensating module 2, are dispersion-compensated by the two dispersion compensators $DC_1$ and $DC_2$ and is then amplified by the light amplifier 22. The amplified signals are outputted to the optical transmission line 92B via the output end 2b of the dispersion compensating module 2.

As described above, the dispersion compensating module 2 according to the second embodiment is variable in its dispersion compensation amount which includes different amounts of dispersion compensation which are set according to the state of port switching in the optical switch $SW_2$. The signals which reach the input end 2a of the dispersion compensating module 2 through the optical transmission line 92A are compensated for by the dispersion compensation amount which is set in the above-described manner, and the dispersion-compensated signals are outputted from either of the output ends 2b and 2c of the dispersion compensating module 2. Accordingly, the dispersion compensating module 2 according to the second embodiment is simple and compact in structure.

The setting of the dispersion compensation amount of the dispersion compensating module 2, i.e., the setting of the port switching in the optical switch $SW_2$, may also be carried out in such a way that the control section 25 detects, through the receiver 24, the extent of waveform degradation of the signals which reaches the input end 2a of the dispersion compensating module 2, and performs such setting on the basis of the detected result. Otherwise, the signals propagating through the optical transmission line 92A may also contain a pilot signal indicative of a signal source which has outputted the signals. On the basis of the pilot signal, the control section 25 obtains the distance (or accumulated dispersion) of the optical transmission line 92A to the signal source which has outputted the signals, and controls the operation of the optical switch $SW_2$ on the basis of the information. In addition, the control section 25 may obtain information indicative of the distance (or accumulated dispersion) of the optical transmission line 92A to the signal source by any means other than the use of the pilot signal, and may control the operation of the optical switch $SW_2$ on the basis of that information. In the case where individual signal sources have different signal wavelengths, the control section 25 may also control the operation of the optical switch $SW_2$ on the basis of the wavelength of each signal.

(First Embodiment of Line Switching Device)

Figure 5:
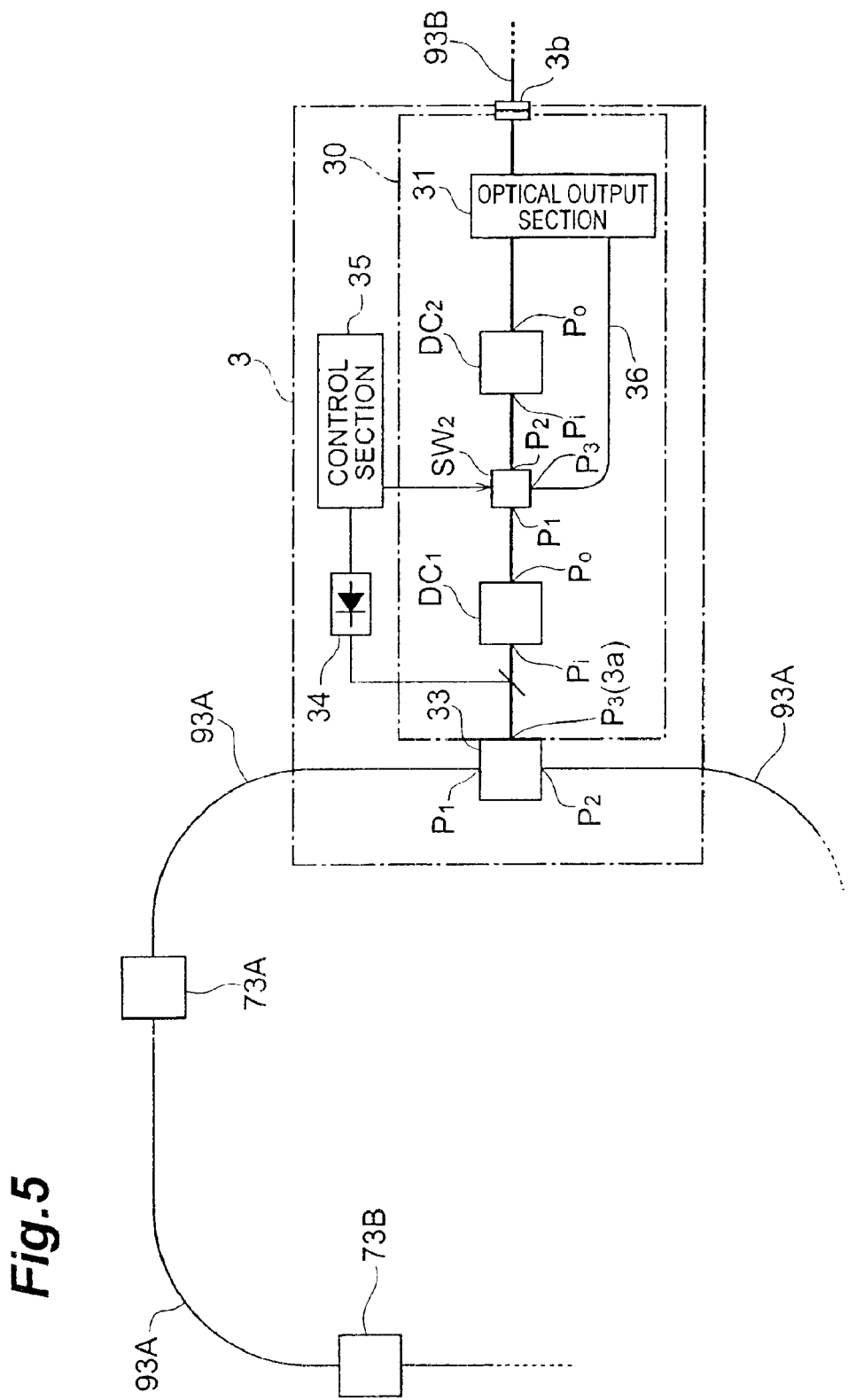
FIG. 5 is a view showing the structure of a first embodiment of a line switching device according to the present invention.

A first embodiment of a line switching device according to the present invention will be described below. FIG. 5 is a view showing the construction of a line switching device 3 according to the first embodiment. In FIG. 5, there are also shown transmitting sections 73A and 73B on an optical communication network. The line switching device 3 is provided with a branching section 33, a dispersion compensating module 30, a receiver 34 and a control section 35. The dispersion compensating module 30 has a dispersion compensator $DC_1$, an optical switch $SW_2$, a dispersion compensator $DC_2$ and an optical output section 31 all of which are disposed in that order between an input end 3a and an output end 3b of the dispersion compensating module 30. In this embodiment, an output port $P_3$ of the branching section 33 corresponds to the input end 3a of the dispersion compensating module 30.

In the dispersion compensating module 30, the optical switch $SW_2$ has the structure shown in FIG. 3. The dispersion compensators $DC_1$ and $DC_2$ and the optical output section 31 have structures similar to those of the corresponding dispersion compensators and optical output section in each of the dispersion compensators 1 and 2 according to the first and second embodiments. Specifically, the dispersion compensating module 30 has a construction which can be varied in the dispersion compensation amount by the dispersion compensator $DC_1$, the optical switch $SW_2$, the dispersion compensator $DC_3$ and the optical output section 31. The line switching device 3 is made of the dispersion compensating module 30, the branching section 33, and the control section 35 which controls port switching in the optical switch $SW_2$ while monitoring the signals branched by the branching section 33 via the receiver 34.

The branching section 33 has the first port $P_1$, the second port $P_2$ and the third port $P_3$ (which corresponds to the input end 3a of the dispersion compensating module 30). The branching section 33 branches signals of a predetermined wavelength band (contained in the signal wavelength band) from the signals propagating through an optical transmission line 93A and reaching the first port $P_1$, and outputs the signals of the predetermined wavelength band to the dispersion compensating module 30 via the third port $P_3$. In addition, the branching section 33 outputs the signals of a wavelength band obtained by excluding the predetermined wavelength band from the signal wavelength band to the optical transmission line 93A via the second port $P_2$.

The branching section 33 preferably uses, for example, an ADM (Add Drop Multiplexer) or an optical XC (Cross Connect). The ADM branches the signals of a predetermined wavelength band from a signal inputted to the first port $P_1$ and drops the signals from the second port $P_2$. At the same time, the ADM newly adds the signals of the predetermined wavelength band to signals of other wavelength bands, and outputs these signals via the second port $P_2$. In the case where the ADM is applied to the branching section 33, the wavelength band of the signals dropped via the third port $P_3$ is generally fixed and hence a wavelength band over which to ensure the operation of the line switching device 3 is fixed, whereby the line switching device 3 becomes easy to design.

The optical XC is an optical device in which, in general multiple optical switches are disposed in matrix form to constitute multiple inputs and multiple outputs, and the position of an output port from which to output signals inputted from a certain input port is determined by port switching in each of the optical switches. It is preferable to apply the optical XC to the branching section 33, because the degree of freedom of selection among signal wavelengths increases. In addition, the stability of the system can easily be ensured by designing the amount of variation in dispersion compensation together with the optical XC. Incidentally, if the control section 35 is constructed to control the branching operation of the branching section 33 and the operation of the optical switch $SW_2$ in a mutually interlocked relation, the reliability of the entire optical communication network is improved.

In the dispersion compensating module 30, the input port $P_i$ of the preceding dispersion compensator $DC_1$ is connected to the third port $P_3$ of the branching section 33. The first port $P_1$ of the optical switch $SW_2$ is connected to the output port Po of the preceding dispersion compensator $DC_1$. The second port $P_2$ of the optical switch $SW_2$ is connected to the input port $P_i$ of the succeeding dispersion compensator $DC_2$. An optical output section 21 conducts to the output end 3b the signals outputted from the output port Po of the preceding dispersion compensator $DC_2$ as well as the signals outputted from the third port $P_3$ of the optical switch $SW_2$ via a branch line 36.

The operation of the line switching device 3 according to the first embodiment will be described below. In this embodiment, the transmitting sections 73A and 73B and the line switching device 3 are connected along the optical transmission line 93A and constitute part of the optical communication network. Part of the signals which are transmitted from each of the transmitting sections 73A and 73B propagates in an optical transmission line 93B when switching between optical paths is performed by the branching section 33 in the line switching device 3.

The signals which are transmitted from a signal source other than the transmitting sections 73A and 73B, which propagates through the optical transmission line 93A, and which reach the line switching device 3 are inputted to the first port $P_1$ of the branching section 33, and are transmitted to the optical transmission line 93A via the second port $P_2$ of the branching section 33. On the other hand, the signals which are transmitted from one of the transmitting sections 73A or 73B, which propagate through the optical transmission line 93A, and which reach the line switching device 3 are inputted to the first port $P_1$ of the branching section 33, and are conducted to the preceding dispersion compensator $DC_1$ via the third port $P_3$ of the branching section 33 (which corresponds to the input end 3a of the dispersion compensating module 30).

In the optical switch $SW_2$, if the optical path from the first port $P_1$ to the third port $P_3$ is in a signal passage enabled state, the signals inputted to the preceding dispersion compensator $DC_1$ are dispersion-compensated by only the preceding dispersion compensator $DC_1$ and are then outputted to the optical transmission line 93B via the optical output section 31. As shown, the distance by which the signals transmitted from the transmitting section 73A propagate through the line switching device 3 in the optical transmission line 93A is short, and the accumulated dispersion amount of the line through which the signals propagate is comparatively small. Accordingly, it is preferable that the signals be dispersion-compensated by only the preceding dispersion compensator $DC_1$.

On the other hand, in the optical switch $SW_2$, if the optical path from the first port $P_1$ to the second port $P_2$ is in a signal passage enabled state, the signals are dispersion-compensated by the two preceding dispersion compensators $DC_1$ and $DC_2$ and are then outputted to the optical transmission line 93B via the optical output section 31. As shown, the signals transmitted from the transmitting section 73B propagate through the optical transmission line 93A by a longer distance to the line switching device 3 and the accumulated dispersion amount of the line through which the signals propagate is comparatively large. Accordingly, it is preferable that the signal be dispersion-compensated by the two preceding dispersion compensators $DC_1$ and $DC_2$.

As described above, the line switching device 3 according to the first embodiment not only performs line switching between optical transmission lines which constitute the optical communication network, but also compensates for the branched signals by the dispersion compensation amount which is set according to the state of port switching in the optical switch $SW_2$. The dispersion compensation amount is variable. The signals to be line-switched from the optical transmission line 93A to the optical transmission line 93B are compensated for by the set dispersion compensation amount and are outputted to the optical transmission line 93B. As described above, the line switching device 3 according to the first embodiment is simple and compact in structure. If the line switching device 3 according to the first embodiment is applied, the degree of design freedom of the optical communication network increases.

The setting of the dispersion compensation amount of the line switching device 3, i.e., the setting of the port switching in the optical switch $SW_2$, may also be carried out in such a way that the control section 35 detects, through the receiver 34, the extent of waveform degradation of the signals to be line-switched, and performs the setting of the port switching on the basis of the detected result. Otherwise, the signals which propagate through the optical transmission line 93A may also contain a pilot signal indicative of a signal source which has outputted the signal. On the basis of the pilot signal, the control section 35 obtains information indicative of the distance (or accumulated dispersion) of the optical transmission line 93A to the signal source which has outputted the signals, and controls the operation of the optical switch $SW_2$ on the basis of that information. In addition, the control section 35 may obtain the distance (or accumulated dispersion) of the optical transmission line 93A to the signal source by any means other than the use of the pilot signal, and may control the operation of the optical switch $SW_2$ on the basis of that information. In the case where individual signal sources have different signal wavelengths, the control section 35 may also control the operation of the optical switch $SW_2$ on the basis of the wavelength of each signal.

(Second Embodiment of Line Switching Device)

Figure 6:
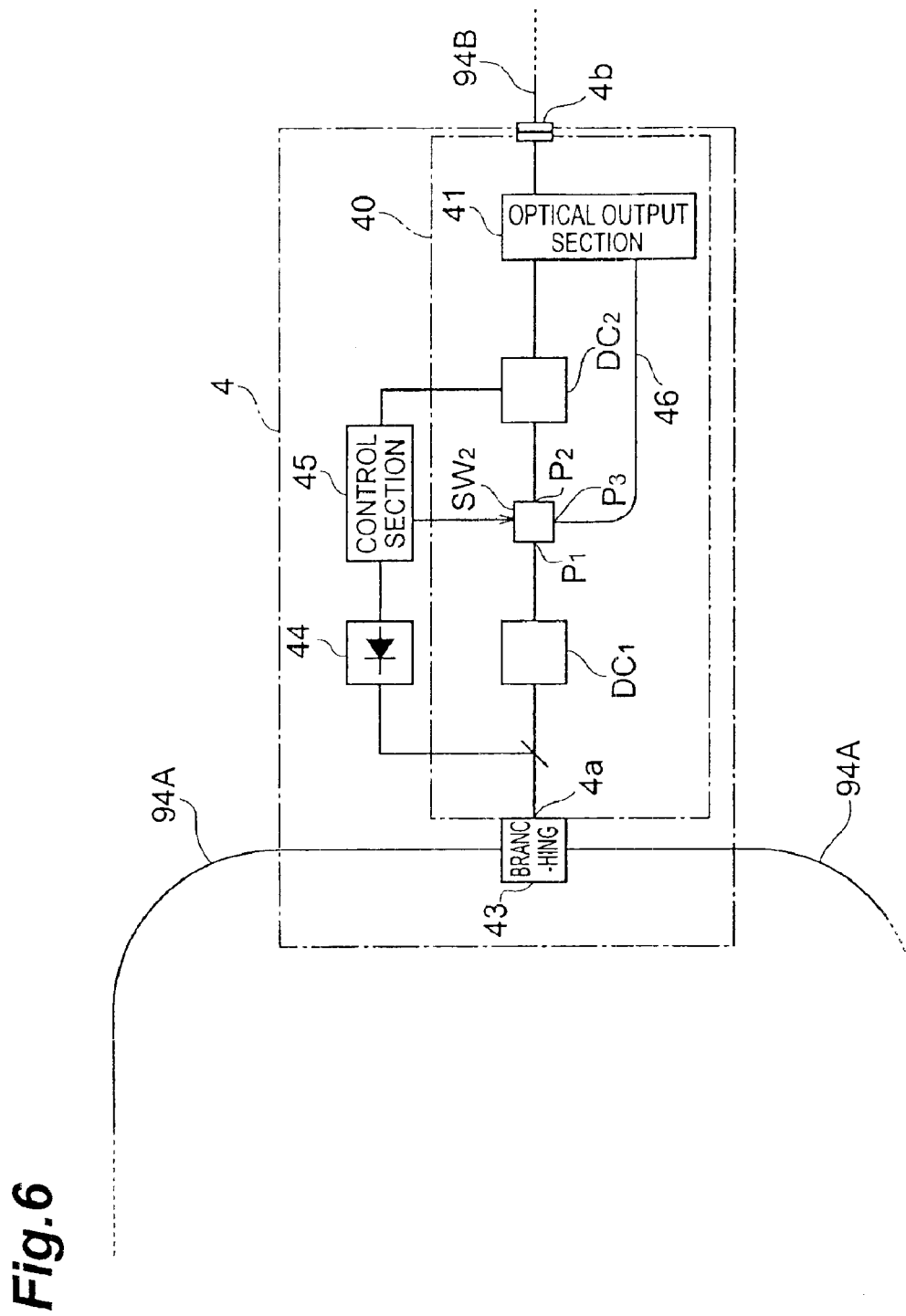
FIG. 6 is a view showing the structure of a second embodiment of the line switching device according to the present invention.

A second embodiment of the line switching device according to the present invention will be described below. FIG. 6 is a view showing the structure of a line switching device 4 according to the second embodiment. The line switching device 4 comprises a branching section 43, a dispersion compensating module 40, an optical output section 41, a receiver 44 and a control section 45. The dispersion compensating module 40 has a dispersion compensator $DC_1$, an optical switch $SW_2$ and a dispersion compensator $DC_2$ in that order all of which are disposed in that order between an input end 4a and an output end 4b of the dispersion compensating module 40. Incidentally, the input end 4a of the dispersion compensating module 40 corresponds to the output port of the branching section 43.

In the dispersion compensating module 40, the optical switch $SW_2$ has the structure shown in FIG. 3. The dispersion compensators $DC_1$ and $DC_2$ and the optical output section 41 have structures similar to those of the corresponding dispersion compensators and optical output section in each of the dispersion compensators 1 and 2 according to the first and second embodiments. Specifically, the dispersion compensating module 40 has a structure which can be varied in the dispersion compensation amount by the dispersion compensator $DC_1$, the optical switch $SW_2$, the dispersion compensator $DC_2$ and the optical output section 41. In this respect, the line switching device 4 is similar to the line switching device 3 according to the first embodiment. The line switching device 4 is made of the dispersion compensating module 40, the branching section 43, the receiving section 44 and the control section 45.

In the second embodiment, signals which propagate in the optical transmission line 94A contains a pilot signal indicative of a signal source which has outputted the signals. The branching section 43 branches this pilot signal and other signals of a predetermined wavelength from the signals. The receiving section 44 receives this pilot signal, and the control section 45 controls the operation of the optical switch $SW_2$ on the basis of the pilot signal from the receiving section 44. Particularly, if the control section 45 determines on the basis of the pilot signal received by the receiving section 44 that the distance by which the signals propagate through the optical transmission line 94A from the signal source to the line switching device 4 is short and the amount of accumulated dispersion of the propagation line is comparatively small, the signal passage line is switched to the optical path from the first port $P_1$ to the second port $P_3$ in the optical switch $SW_2$. On the other hand, the control section 45 determines that the distance by which the signals propagate through the optical transmission line 94A from the signal source to the line switching device 4 is long and the amount of accumulated dispersion of the propagation line is comparatively large, the signal passage line is switched to the optical path from the first port $P_1$ to the second port $P_3$ in the optical switch $SW_2$.

The operation of the line switching device 4 according to the second embodiment will be described below. The signals to be line-switched from the optical transmission line 94A to the optical transmission line 94B are branched by the branching section 43 in the line switching device 4, and the branched signals are inputted to the preceding dispersion compensator $DC_1$. At this time, the pilot signal contained in the branched signals is received by the receiving section 44. On the basis of the pilot signal received by the receiving section 44, the control section 45 obtains the distance by which the signals has propagated through the optical transmission line 94A from a signal source to the line switching device 4, and obtains the accumulated dispersion amount of the propagation line. On the basis of this result, the control section 45 exerts port switching control on the optical switch $SW_2$.

In the optical switch $SW_2$, if the optical path from the first port $P_1$ to the third port $P_3$ is in a signal passage enabled state, the signals, which have been inputted to the preceding dispersion compensator $DC_1$, are dispersion-compensated by only the preceding dispersion compensator $DC_1$ and are then outputted to the optical transmission line 94B via the optical output section 41. On the other hand, in the optical switch $SW_2$, if the optical path from the first port $P_1$ to the second port $P_2$ is in a signal passage enabled state, the signals, which have been inputted to the preceding dispersion compensator $DC_1$, are dispersion-compensated by the two dispersion compensators $DC_1$ and $DC_2$ and are then outputted to the optical transmission line 94B via the optical output section 41.

In particular, if the distance by which the signals have propagated through the optical transmission line 94A from the signal source to the line switching device 4 is short, the signals which has reached the line switching device 4 are dispersion-compensated by only the preceding dispersion compensator $DC_1$ and are then outputted to the optical transmission line 94B via the optical output section 41. On the other hand, if the accumulated dispersion amount of the propagation line of the optical transmission line 94A is large, the signals which has reached the line switching device 4 are dispersion-compensated by the two dispersion compensators $DC_1$ and $DC_2$ and are then outputted to the optical transmission line 94B via the optical output section 41.

In this manner, the line switching device 4 according to the second embodiment not only performs line switching but also compensates for the branched signals by the dispersion compensation amount which is set according to the state of port switching in the optical switch $SW_2$. The dispersion compensation amount is variable. The signal to be line-switched from the optical transmission line 94A to the optical transmission line 94B are compensated for by the set dispersion compensation amount and are outputted to the optical transmission line 94B. As described above, the line switching device 4 according to the second embodiment is simple and compact in structure. If the line switching device 4 is applied, the degree of design freedom of the optical communication network increases. Moreover, in the second embodiment, the branched signals contain a pilot signal indicative of a signal source which has transmitted the signals, and the optical switch $SW_2$ executes control on the basis of the pilot signal, whereby the dispersion compensation amount can be set easily and reliably.

(First Embodiment of Optical Communication System)

Figure 7:
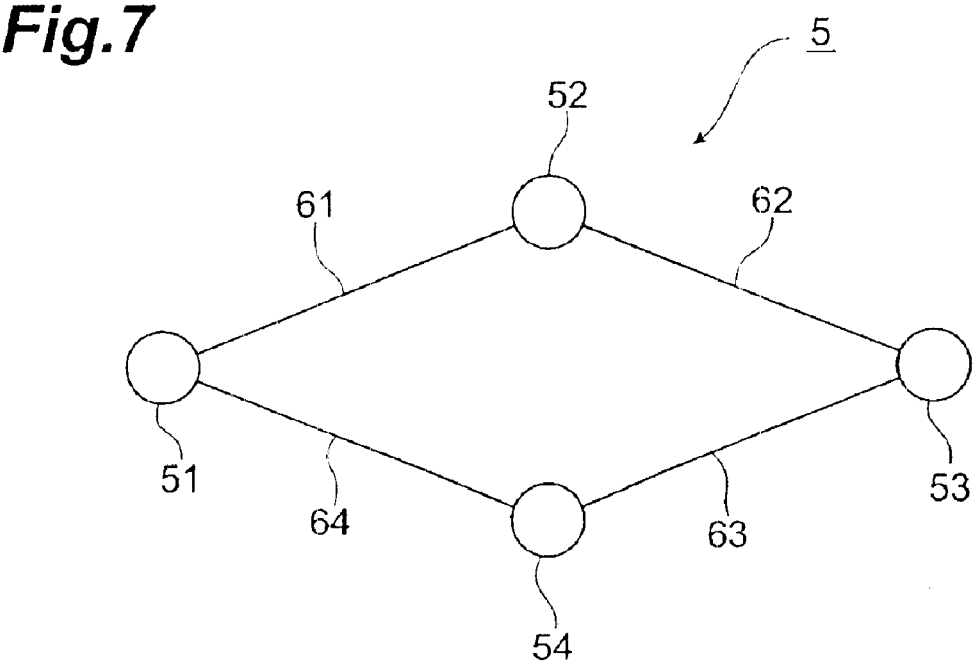
FIG. 7 is a view showing the structure of a first embodiment of an optical communication system according to the present invention.

A first embodiment of an optical communication system according to the present invention will be described below. FIG. 7 is a view showing the structure of an optical communication system 5 according to the first embodiment. This optical communication system 5 includes four stations 51 to 54, and the station 51 and the station 52 are interconnected by a path 61, the station 52 and the station 53 are interconnected by a path 62, the station 53 and the station 54 are interconnected by a path 63, and the station 54 and the station 51 are interconnected by a path 64.

In the optical communication system 5 according to the first embodiment, there are two optical transmission lines each of which leads from the transmitting station 51 to the receiving station 53: a signal path which passes through a path 61 and a path 62 in sequence (hereinafter referred to as a main transmission line to be used under normal conditions); and a signal path which passes through a path 64 and a path 63 in sequence (hereinafter referred to as an alternative transmission line to be used under abnormal conditions or during malfunction). In the following, $D_1$ indicates the dispersion of the path 61 and $L_1$ indicates the length of the path 61; $D_2$ indicates the dispersion of the path 62 and $L_2$ indicates the length of the path 62; $D_3$ indicates the dispersion of the path 63 and $L_3$ indicates the length of the path 63; and $D_4$ indicates the dispersion of the path 64 and $L_4$ indicates the length of the path 64.

At this time, the accumulated dispersion of the main transmission line is $D_1 \cdot L_1 + D_2 \cdot L_2$, while the accumulated dispersion of the alternative transmission line is $D_3 \cdot L_3 + D_4 \cdot L_4$. If the respective accumulated dispersions of the main transmission line and the alternative transmission line differ from each other, the accumulated dispersion of the optical transmission line which leads from the transmitting station 51 to the receiving station 53 changes with the line switching between the main and alternative optical transmission lines. Therefore, the optical communication system 5 according to the first embodiment comprises a dispersion compensating module which is variable in the dispersion compensation amount, whereby it is possible to maintain consistently good transmission quality even during the occurrence of the line switching between such optical transmission lines.

Figure 8:
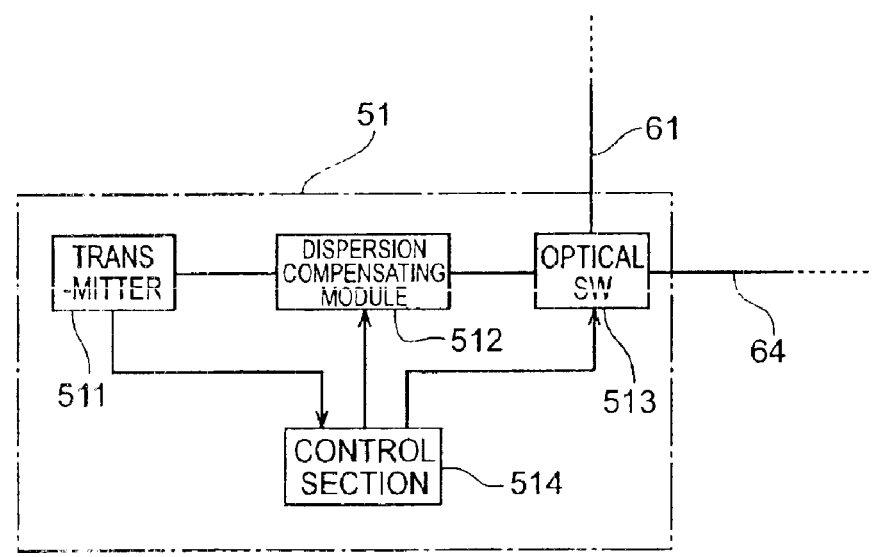
FIG. 8 is a view showing a first structure of a transmitting station in the optical communication system according to the first embodiment shown in FIG. 8.

FIG. 8 is a view showing a structure of the transmitting station 51 in the optical communication system 5 according to the first embodiment. The transmitting station 51 shown in FIG. 8 includes a transmitter 511, a dispersion compensating module 512, an optical switch 513 (FIG. 3) and a control section 514. The transmitter 511 transmits signals of a signal channel contained in a signal wavelength band. The dispersion compensating module 512 has a structure capable of varying its dispersion compensation amount, as shown in FIGS. 1, 4 and the like. The dispersion compensating module 512 compensates for the dispersion of the line (the main transmission line or the alternative transmission line) which leads from the transmitting station 51 to the receiving station 53. The optical switch 513 transmits the signals to one of the paths 61 or 64. The control section 514 controls port switching in the optical switch 513, thereby selecting one of the main transmission line and the alternative transmission line as well as setting the dispersion compensation amount of the dispersion compensating module 512. The control section 514's setting of the dispersion compensation amount of the dispersion compensating module 512 is performed by the port switching in the optical switch disposed in the dispersion compensating module 512.

Figure 9:
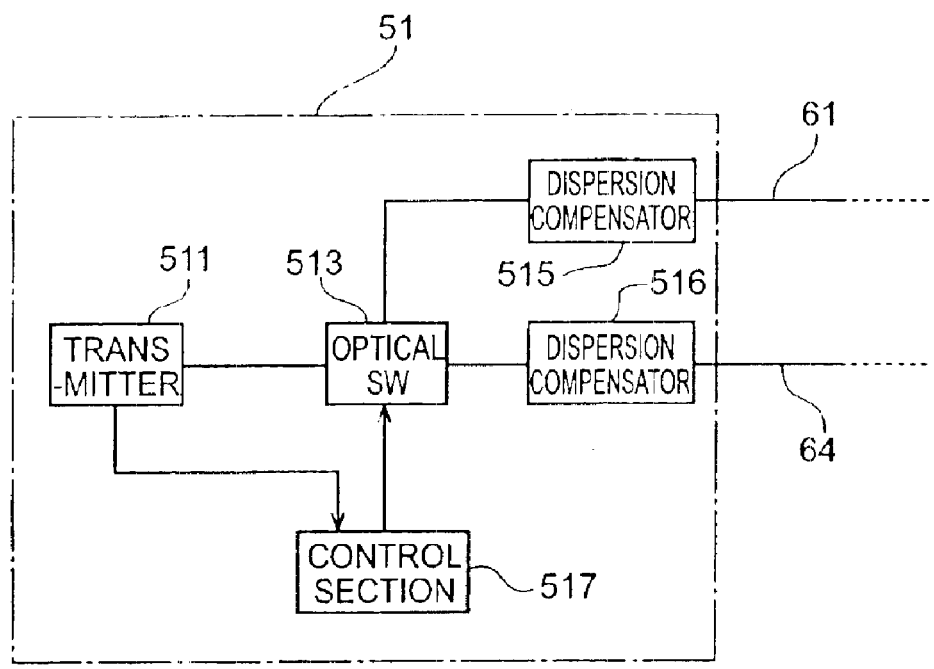
FIG. 9 is a view showing a second structure of a transmitting station in the optical communication system according to the first embodiment shown in FIG. 8.

FIG. 9 is a view showing another construction of the transmitting station 51 in the optical communication system 5 according to the first embodiment. As shown in FIG. 9, the transmitting station 51 includes the transmitter 511, the optical switch 513, a dispersion compensator 515, a dispersion compensator 516 and a control section 517. The dispersion compensator 515 compensates for the dispersion of the main transmission line which leads from the transmitting station 51 to the receiving station 53 via the transit station 52. The dispersion compensator 516 compensates for the dispersion of the alternative transmission line which leads from the transmitting station 51 to the receiving station 53 via the transit station 54. In addition, the control section 517 controls port switching in the optical switch 513, thereby selecting either one of the main transmission line and the alternative transmission line.

Figure 10:
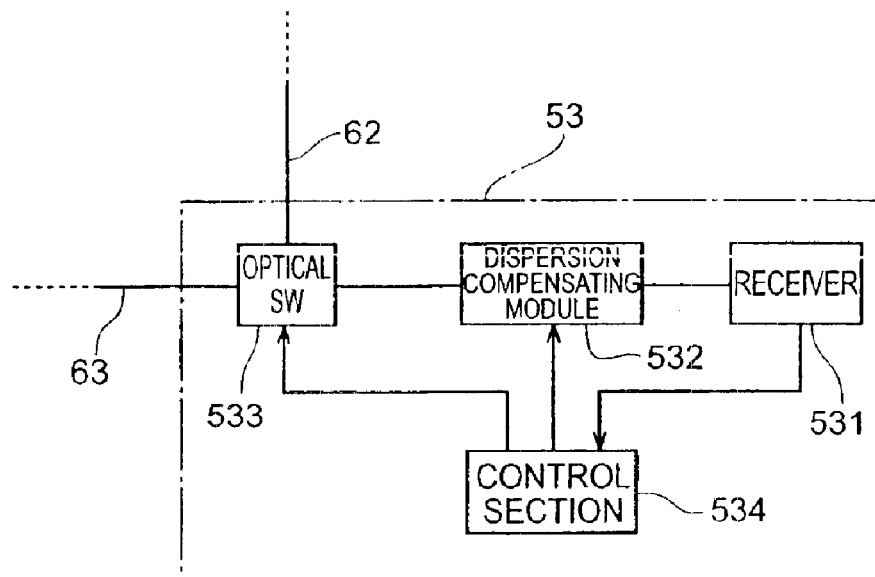
FIG. 10 is a view showing the structure of a receiving station in the optical communication system according to the first embodiment shown in FIG. 8.

In addition, the receiving station 53 may includes a dispersion compensating module. FIG. 10 is a view showing one construction of the receiving station 53 in the optical communication system 5 according to the first embodiment. The receiving station 53 shown in FIG. 10 comprises a receiver 531, a dispersion compensating module 532, an optical switch 533 and a control section 534. The receiver 531 receives a signal. The dispersion compensating module 532 has a structure capable of varying the dispersion compensation amount, as shown in FIGS. 1, 4 and others. The dispersion compensating module 532 compensates for the dispersion of the signal path which leads from the transmitting station 51 to the receiving station 53 (the main transmission line or the alternative transmission line). The optical switch 533 conducts to the dispersion compensating module 532 the signals which has reached one of the paths 61 or 64. The control section 534 controls port switching in the optical switch 533, thereby selecting one of the main transmission line and the alternative transmission line as well as setting the dispersion compensation amount of the dispersion compensating module 532. The control section 534's setting of the dispersion compensation amount of the dispersion compensating module 532 is performed by the port switching in the optical switch disposed in the dispersion compensating module 532.

In addition, each of the repeaters 52 and 54 may includes a dispersion compensating module. The dispersion compensating module provided in the repeater 52 compensates for the dispersion of the main transmission line, while the dispersion compensating module provided in the repeater 52 compensates for the dispersion of the alternative transmission line.

As described above, in the optical communication system 5 according to the first embodiment, even if the dispersion of an optical transmission line varies due to any cause such as line switching or a change in line length, the dispersion of the optical transmission line is dynamically compensated for because the dispersion compensation amount is appropriately set by port switching in the optical switch in the dispersion compensating module. Accordingly, the optical communication system 5 can effectively restrain the degradation of signal waveforms, thereby maintaining good transmission quality. In addition, in the optical communication system 5, since the dispersion compensation amount can be appropriately and dynamically set by port switching in the optical switch, the time required to set the dispersion compensation amount is short and the reliability of the system is high.

As in the first embodiment, even if the main transmission line and the alternative transmission line differ in accumulated dispersion, one of the main transmission line and the alternative transmission line is selected by the control section 514 (or 534), and the dispersion compensation amount is set by the port switching in the optical switch inside the dispersion compensating module 512 (or 532). Accordingly, whichever line may be selected, the degradation of signal waveforms can be effectively restrained and good transmission quality can be maintained In particular, it is preferable that the control section 514 (or 534) approximately simultaneously carry out the selection of a line by means of the optical switch 513 (or 533) and the setting of the dispersion compensation amount in the dispersion compensating module 512 (or 532). This operation makes far shorter the time required to complete the setting of the dispersion compensation amount and far higher the reliability of the system. Regarding an algorithm for controlling the line switching from the main transmission line to the alternative transmission line, there is the following clear distinction between this first embodiment and a prior art (for example, the art described in Japanese Patent Laid-Open No. 84317/1998).

In particular, in the prior art, (a) if it is detected that an abnormality has occurred in a main transmission line, (b) a location where the abnormality has occurred is specified and (c) an alternative transmission line in which the abnormal location can be avoided is selected, and (d) the main transmission line is switched to the selected alternative transmission line. Then, after the line switching to the alternative transmission line has been completed, (e-1) the transmission characteristics (particularly, accumulated dispersion) of the alternative transmission line are evaluated and (f-1) an optimum dispersion compensation amount is determined on the basis of the result of the evaluation, thereby (g-1) finally setting the dispersion compensation amount in a dispersion compensating module. Otherwise, after the line switching to the alternative transmission line has been completed, (e-2) the transmission characteristics (particularly, accumulated dispersion) of the alternative transmission line are evaluated and (f-2) the dispersion compensation amount by the dispersion compensating module is controlled, and (g-2) it is determined whether dispersion compensation has been fully effected under this control. Incidentally, the steps (e-2), (f-2) and (g-2) are repeated until the dispersion compensation has been fully effected.

Incidentally, this first embodiment is similar to the above-described prior art in regard to the steps (a), (b) and (c), but in this first embodiment, after the alternative transmission line has been selected, (d) the main transmission line is switched to the alternative transmission line and at the same time the dispersion compensation amount in the dispersion compensating module is set according to the selected alternative transmission line. In addition, at the same time, a transmitting/receiving system may also be switched. In this manner, in the optical communication system 5 according to the first embodiment, the time required to set the dispersion compensation amount is short and the reliability of the system is high.

Incidentally, in the optical communication system 5, for example, a quartz-base single mode optical fiber whose dispersion is zero near a 1.3 $\mu$m wavelength and whose transmission loss is the smallest near a 1.55 $\mu$m wavelength is used as each of the paths 61 to 64. The signal wavelength used in this system is suitably a 1.55 $\mu$m wavelength band (1,530 nm to 1,565 nm). A signal of wavelength band 1.55 $\mu$m can be transmitted through the paths 61 to 64 with the smallest transmission loss, and can reduce accumulated loss after having passed through the dispersion compensating module. In addition, if the bit rate on any signal channel is 10 Gb/s or more, the waveform degradation of signals due to accumulated dispersion is remarkable, but in this optical communication system 5, since the dispersion compensating module which is variable in the dispersion compensation amount is applied, such waveform degradation is not at all remarkable, whereby good transmission quality can be maintained.

(Second Embodiment of Optical Communication System)

Figure 11:
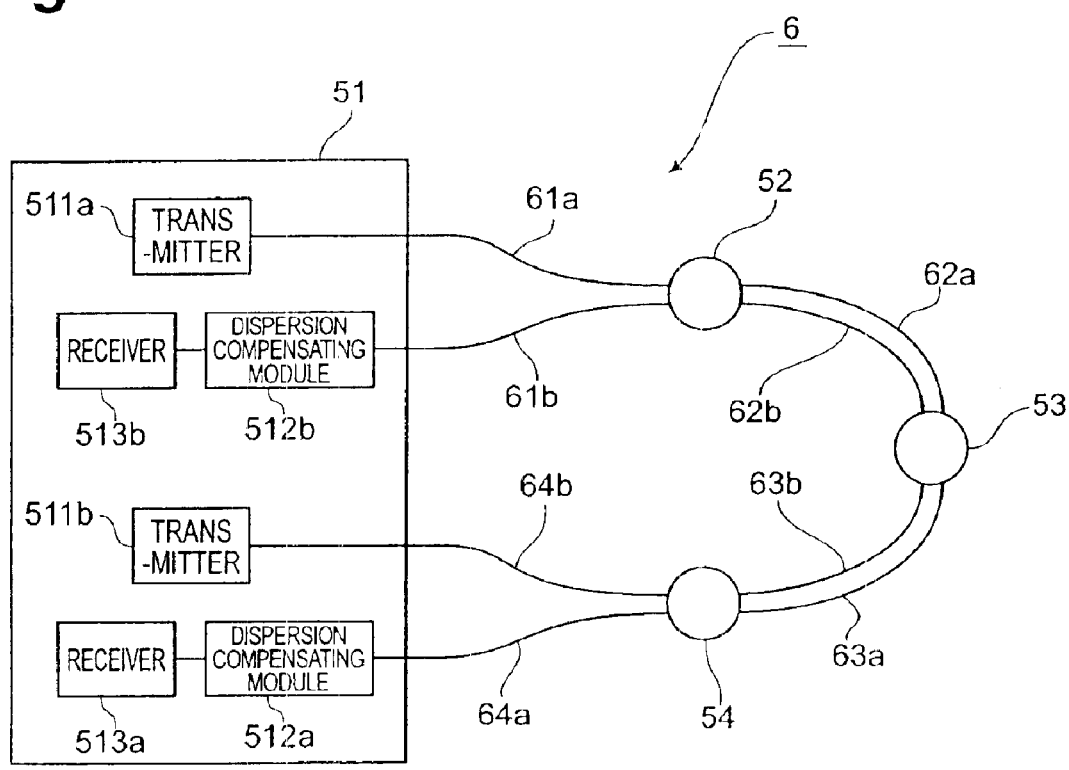
FIG. 11 is a view showing the structure of a second embodiment of the optical communication system according to the present invention.

A second embodiment of an optical communication system according to the present invention will be described below. FIG. 11 is a view showing the construction of an optical communication system 6 according to the second embodiment. This optical communication system 6 includes four stations 51 to 54, and the station 51 and the station 52 are interconnected by paths 61a and 61b, the station 52 and the station 53 are interconnected by paths 62a and 62b, the station 53 and the station 54 are interconnected by paths 63a and 63b, and the station 54 and the station 51 are interconnected by paths 64a and 64b.

The optical communication system 6 has optical transmission lines which constitute a ring-type network construction. Specifically, three child stations 52 to 54 are disposed with respect to one parent station 51 in a ring-like form. The parent station 51 comprises transmitters 511a and 511b, dispersion compensating modules 512a and 512b and receivers 513a and 513b. A signal path which sequentially passes through the paths 61a, 62a, 63a and 64a constitutes a main transmission line, while a signal path which sequentially passes through the paths 64b, 63b, 62b and 61b constitutes an alternative transmission line. The dispersion compensating module 512a has the structure shown in FIGS. 1, 4 and the like, and is capable of varying its dispersion compensation amount. Under normal conditions, the dispersion compensating module 512a compensates for the dispersion of the signal path which leads from the transmitter 511a the parent station 51 to the receiver 513a of the parent station 51 via the main transmission line. The dispersion compensating module 512b has a similar structure (FIGS. 1, 4 and the like), and is capable of varying its dispersion compensation amount. The dispersion compensating module 512b is used when only the main transmission line suffers abnormality or malfunction, and compensates for the dispersion of the signal path which leads from the transmitter 511b the parent station 51 to the receiver 513b of the parent station 51 via the alternative transmission line.

In this optical communication system 6, for example, if both of the paths 64a and 64b disposed between the parent station 51 and the child station 54 suffer abnormality or malfunction, not only is it impossible to use the main transmission line (the signal path which sequentially passes through the paths 61a, 62a, 63a and 64a), but it is also impossible to use the alternative transmission line (the signal path which sequentially passes through the paths 64b, 63b, 62b and 61b). In this case, a line is selected which sequentially passes through the paths 61a, 62a and 63a from the transmitter 511a to the child station 54 and is turned at this child station 54 and sequentially passes through the paths 63b, 62b and 61b and the dispersion compensating module 512b to the receiver 513b.

In the case where the line is turned in this manner, the accumulated dispersion of the line increases. However, in the optical communication system 6 according to the second embodiment, since each of the dispersion compensating modules 512a and 512b is variable in its dispersion compensation amount, it is possible to maintain consistently good transmission quality by appropriately and dynamically setting the dispersion compensation amount according to the position of the turn. In general, a position (any of the child stations 52 to 54) which can become the turn is known (i.e., a value which can be taken as accumulated dispersion is known), and even if the position of the turn is changed, since the respective dispersion compensating modules 512a and 512b are constituted by alternatively arranging the dispersion compensators having an appropriate dispersion compensation amounts, the number of dispersion compensators through which the signals pass is set from among the n-number of dispersion compensators according to the state of port switching in each optical switch, whereby the dispersion compensation amount for the signals is set. In addition, the dispersion compensation amount in this dispersion compensating module is variable, and the dispersion compensation amount can be varied to a great extent. The signals which has reached the input end of the dispersion compensating module is compensated for by the set dispersion compensation amount, and are then outputted from the output end of the dispersion compensating module. In this manner, the dispersion compensating module is simple and compact in construction.

According to the line switching device which includes the dispersion compensating module, from among signals propagating through the optical transmission line of the optical communication network, the signals of a predetermined wavelength band are branched by a branching section and are then dispersion-compensated. In other words, in the line switching device, not only are switching between lines carried out, but also the branched signals are dispersion-compensated. In this manner, the line switching device is simple and compact in construction, and the degree of design freedom of the optical communication network can be increased.

Moreover, according to the optical communication system according to the present invention, the dispersion of the optical transmission line is compensated for by the dispersion compensating module. Accordingly, even if the dispersion of the optical transmission line varies due to any cause, port switching in the optical switch in the dispersion compensating module is carried out, whereby the dispersion compensation amount can be appropriately set. Accordingly, the degradation of signal waveforms is effectively restrained and good transmission quality is maintained.

What is claimed is:

1. A line switching device comprising:
   a branching section branching sianals in a predetermined wavelength band contained in a signal wavelength band from signals propagating through an optical transmission line in an optical communication network; and
   a dispersion compensating module comprising:
   an input end for introducing signals which propogate in said optical transmission line;
   an output end for launching the signals introduced from the input end to said optical transmission line;
   a plurality of dispersion compensators provided between said input end and said output end, each of said dispersion of said optical transmission line in the signal wavelength band; and
   one or more branching optical switches provided between each of said plurality of dispersion compensators, each of said branching optical switches having a first port for inputting the signals from an adjacent dispersion compensator positioned upstream as viewed from a traveling direction of the signals, a second port for outputting the signals from said first port to an adjacent dispersion compensator positioned downstream, and a third port for conducting the signals from said first port to a branch line different from an optical path constituted by said plurality of dispersion compensators, said dispersion compensating for the dispersion of said optical transmission line, in the predetermined wavelength band containing the signal branched by said branching section,
   wherein the signals branched by said branching section includes a pilot signal indicative of a signal source which has transmitted the signals, and
   wherein said line switching device further comprises a receiving section receiving the pilot signal contained in the signals and a control section for controlling a port switching operation in each of said optical switches in said dispersion compensating module on the basis of the pilot signal received by said receiving section.

2. A line switching device according to claim 1, wherein said branching section includes an add drop multiplexer.

3. A line switching device according to claim 1, wherein said branching section includes an optical cross connect.

4. A line switching device according to claim 1, further comprising a control section for controlling a branching function of said branching section and a port switching operation of each of said optical switches in said dispersion compensating module in a mutually interlocked relation.

5. An optical communication system comprising:
   a dispersion compensating module, for compensating for a dispersion of an optical transmission line in a signal wavelength band, comprising:
   an input end for introducing signals which propogate in said optical transmission line;
   an output end for launching the signals introduced from the input end to said optical transmission line;
   a plurality of dispersion compensators provided between said input end and said output end, each of said dispersion compensators having a dispersion of sign opposite to that of a dispersion of said optical transmission line in the signal wavelength band; and one or more branching optical switches provided between each of said plurality of dispersion compensators, each of said branching optical switches having a first port for inputting the signals from an adjacent dispersion compensator positioned downstream, and a third port for conducting the signals from said first port to a branch line different from an optical path constituted by said plurality of dispersion compensators;

a control section for controlling port switching of an optical switch included in said dispersion compensating module, thereby adjusting a dispersion compensation amount for signals passing through said dispersion compensating module; and an optical transmission line provided between a first station and a second station and constituted by a plurality of lines, wherein said control section selects one of said plurality of lines as a signal propagation line from said first station to said second station when adjusting the dispersion compensation amount in said dispersion compensating module.

6. An optical communication system according to claim 5, wherein said control section performs a selection of said signal propagation line and an adjustment of the dispersion compensation amount in said dispersion compensating module.

7. An optical communication system according to claim 5, wherein said dispersion compensating module is provided in at least one of said first station, said second station and a repeater provided between said first station and said second station.

8. An optical communication system according to claim 5, wherein said optical transmission line includes a ring-type network.

9. An optical communication system according claim 5, wherein at least one of signal channels in the signal wavelength band is a signal channel contained in a wavelength range of 1,530 nm to 1,565 nm.

10. An optical communication system according to claim 5, wherein at least one of signal channels in the signal wavelength band is a bit rate of 10 Gb/s or more.

* * * * *